United States Patent [19]

Obara et al.

[11] Patent Number: 5,232,722
[45] Date of Patent: Aug. 3, 1993

[54] SUBSTITUTE FOR FAT MEAT FOOD

[75] Inventors: Katsuyoshi Obara, Sakado; Naoyuki Hanawa; Mayumi Takeuchi, both of Kawagoe; Tatsuhiko Mio, Kasukabe, all of Japan

[73] Assignees: Snow Brand Milk Products Co., Ltd.; Snow Brand Food Co., Ltd., both of Hokkaido, Japan

[21] Appl. No.: 765,724

[22] Filed: Sep. 26, 1991

[30] Foreign Application Priority Data

Sep. 28, 1990 [JP] Japan ................... 2-257530

[51] Int. Cl.$^5$ ............... A23J 3/08; A23L 1/31
[52] U.S. Cl. ................... 426/104; 426/574; 426/643; 426/652; 426/802; 426/657; 426/641
[58] Field of Search ............ 426/657, 104, 574, 646, 426/104, 652, 804, 583, 641, 643, 802

[56] References Cited

U.S. PATENT DOCUMENTS

| 3,711,291 | 1/1973 | Leidy et al. | 426/574 |
| 3,836,678 | 9/1974 | Leidy et al. | 426/574 |
| 3,840,677 | 10/1974 | Leidy et al. | 426/802 |
| 3,919,435 | 11/1975 | Feldbrugge et al. | 426/574 |
| 3,922,352 | 11/1975 | Tewey | 426/802 |
| 3,930,033 | 12/1975 | Corliss et al. | 426/802 |
| 4,161,552 | 7/1979 | Melachouris | 426/646 |
| 4,324,807 | 4/1982 | Kim et al. | 426/802 |
| 4,361,588 | 11/1982 | Herz | 426/104 |
| 4,376,134 | 3/1983 | Kumar | 426/104 |
| 4,388,333 | 6/1983 | Maurice et al. | 426/802 |
| 4,455,318 | 6/1984 | Maurice et al. | 426/802 |
| 4,504,515 | 3/1985 | Hahenester et al. | 426/646 |

Primary Examiner—Jeanette Hunter
Attorney, Agent, or Firm—Browdy and Neimark

[57] ABSTRACT

The present invention provides a fat substitute for meat food, which comprises a gelling material comprising a whey protein concentrate and a casein protein, the amount of the whey protein concentrate being from about 5 to about 20 percent by weight of the weight of the gelling material and the amount of the casein protein being from about 1 to about 10 percent by weight of the weight of the gelling material.

13 Claims, No Drawings

SUBSTITUTE FOR FAT MEAT FOOD

BACKGROUND OF THE INVENTION

The present invention relates to a fat substituted for meat food which is added to processed food of minced meat and the like.

People have a tendency to like processed food comprising low fat meat of a coarse minced meat type. Particularly, they imagine processed food such as low fat sausages and hamburgers having meat grains to be of good quality and healthy.

Sausages are generally produced by adding water, common salt, a phosphate, granulated sugar and the like to no fat pork and fat such as lard and beef tallow, casing the mixture and heat-treating the case. The fat such as lard and beef tallow is used to obtain food of juicy and agreeable tastes and to lower the production cost. However, since the amount of fat added to the sausages comes to about 30% by weight, such a processed food having a high caloric value is disliked by consumers.

In such market environment, some kinds of food are proposed to reduce food calories, a low fat sausage, containing an emulsified composition obtained by emulsifying eatable oils and fats in water with an eatable surface-active agent and a process for production of the composition (Japanese unexamined patent application number 1-112969), processed meat food characterized in that it is obtained by heating to coagulate a mixture of an emulsified liquid of thermal solidifying protein and oil with finely ground meat (Japanese Unexamined Patent Publication Number 62-3768) and the like.

In the above processes, reduction of calorific values and improvement of tastes are expectable. However, since gelated materials are not mixed with meat, coarse ground meat type sausages agreeable to the taste in which meat and fat substitute are dispersed can not be obtained.

Furthermore, in Japanese Unexamined Patent Publication Number 1-277449, food whose gelling power is strengthened by adding a whey protein isolate (W.P.I.) and a milk serum mineral is disclosed. Though the food has elasticity, it is not a coarse ground meat type. Reduction of the calorific value is not expectable.

In Japanese Unexamined Patent Publication Number of 63-283545, heat-irreversible food having high gel strength is disclosed. The food is jelly or the like which contains xanthan gum and W.P.I. or another proteins and a pH value of the food solution is kept at an isoelectric point or less of the protein contained. However, the food is not a coarse ground meat type and reduction of the calorific value is not expectable. Moreover, there is no example of ground meat food such as sausage and ham.

SUMMARY OF THE INVENTION

The present invention aims to provide a fat substituted for meat food derived from protein. A heat resistant gelling material which mainly comprises milk protein is used as the fat substitute. The material is added in a process for producing ground meat food such as low fat ham, sausage or hamburgers of a coarse ground meat type.

The present inventions provides a fat substitute for meat food, which comprises a gelling material comprising a whey protein concentrate of 5 to 20 percent by weight and a casein protein of 1 to 10 percent by weight of the gelling material.

DETAILED DESCRIPTION OF THE INVENTION

The inventors of the present invention have already disclosed "a process for producing processed meat food in which a whey protein is added". The present invention provides the improvement of the above process.

The fat substitute for meat food which mainly comprises the protein obtained as a gelling material by a process which comprises adding water to a whey protein of 5 to 20 percent by weight, preferably 8 to 15 percent by weight and a casein protein of 1 to 10 percent by weight, preferably 3 to 7 percent by weight, mixing the aqueous solution with a homomixer or the like, and heating the mixture at 80° C. or more. In the process, when the amount of the whey protein is less than 5 percent by weight, no heat resistant gelling material is obtained, and when the amount of the whey protein is more than 20 percent by weight, a pleasant taste is not given. Further, when the amount of the casein protein is less than 1 percent of weight, no proper pieces of protein gel are formed because adherence and elasticity of the gelling material are lowered. On the other hand, when the amount of the casein protein is more than 10 percent by weight, the gelling material adheres to form lumps and gives an unpleasant taste.

To improve the taste and to prevent water separation, fats such as beef tallow, lard and vegetable oils; stabilizers such as locust bean gum and guar gum; and emulsifiers such as sugar ester, monoglyceride and lecithin can be added.

As an example, in a process for producing sausage wherein lean pork, lard, water, a phosphate, granulated sugar, sodium nitrate and sodium ascorbate are mixed, the whole or a part quantity of the lard can be replaced by the substitute for fat obtained by the above method. Practically, the above substitute for fat is cut to pieces of 1 to 10 mm in diameter with a silent cutter or the like, the pieces are mixed with the above materials to disperse in the lean pork and the mixture is filled in casings and heated. Then, a low fat sausage of a coarse ground meat type can be obtained.

Processed foods of minced meat and fish meat can be exemplified as foods to which the fat substitute of the present invention is added, and such foods can be employed regardless of their kinds. In particular, ingredients of hamburgers, putty, meatballs, coarse ground meat sausages, shish kebab, dumplings stuffed with minced pork, shao-mais, cabbage rolls and the like whose raw materials are minced meat are preferred. The fat substitute of the present invention are especially useful to hamburgers, putty and coarse ground meat sausages.

According to the present invention, since a heat resistant gelling material which comprises a whey protein concentrate and a casein protein is employed as a fat substitute in food, the fat content is lowered without denaturing the meat tissue in the food and the taste of particles of coarse ground meat is maintained as it is. Moreover, the fat substitute in food which can be stored for a long time without remarkable water separation and water absorption can be provided.

DESCRIPTION OF THE PREFERRED EMBODIMENTS

The following examples illustrate the present invention more specifically.

EXAMPLE 1

Coarse Ground Meat

To 12 g of whey protein, 6 g of casein protein, 0.1 g of locust bean gum and 0.2 g of sugar ester, 73.7 g of water is added and the mixture was mixed with a homomixer. Then, 8 g of beef tallow which had been molten at 60° C. was added to the mixture.

The mixture was homogeneously emulsified, and heated at 95° C. for 30 minutes to obtain gel. The gel was cooled to obtain 100 g of a substitute for fat.

The fat substitute was cut with a silent cutter into pieces of 2 to 5 mm in diameter. To 20 g of the pieces, 53.6 g of minced lean pork, 10 g of lard, 14 g of water, 0.5 g of sodium phosphate, 1.5 g of common salt, 0.4 g of granulated sugar, 0.01 g of sodium nitrate and 0.05 g of sodium ascorbate were mixed. After packing in collagen casings the mixture was heated at 70° C. for 50 minutes to obtain low fat sausage.

In spite of the fat content less than 30% of that of usual sausage, the sausage obtained had good savor and taste.

EXAMPLE 2

Coarse Ground Meat Sausage

Fifteen grams of whey protein, 4 g of casein protein and 0.1 g of monoglyceride were mixed with a homomixer. The, 5 g of corn oil was added to the mixture. After homogeneously emulsifying, the mixture was heated at 85° C. for 40 minutes to obtain gel. 100 g of fat substitute was prepared.

The fat substitute was cut with a dicer into pieces of 4 mm in diameter. To 50 g of the pieces, 100 g of minced lean pork, 45 g of minced lean beef, 25 g of beef tallow, 4 g of sugar, 2 g of common salt, 1 g of sodium phosphate, 0.03 g of sodium nitrite, 0.13 g of sodium ascorbate and 20 g of water were mixed. After packing in natural sheep gut casings, the mixture was heated at 75° C. for 30 minutes to obtain low fat sausage of a coarse ground meat type.

In spite of the fat content less than 50% of that of usual sausage, the sausage obtained had good savor and taste.

EXAMPLE 3

Fish Sausage 150 g of minced fish of refrigerated pollack, 60 g of ground fish of tuna, 35 g of potato starch, 20 g of common salt, 5 g of sugar, 0.2 g of sodium nitrite, 3 g of sodium phosphate, a small quantity of spice were mixed with a silent cutter for 3 minutes. After adding 100 g of the substitute pieces obtained in Example 1 and having a diameter of 2 to 5 mm, the mixture was continued to mix for 2 minutes. The mixture obtained was packed into Kurehalon (Trade name) film casings, it was heated for 60 minutes at 85° C., and fish meat sausage was obtained.

Pieces of fish sausage obtained were not small, and these pieces were elastic and had good taste.

EXAMPLE 4

Hamburger 100 g of the substitute pieces obtained in Example 1 and having a diameter of 2 to 5 mm, 400 g of minced lean pork, 75 g of finely cut onion pieces, 75 g of eggs, 50 g of bread crumbs, 50 g of mil, 5 g of common salt and a small quantity of pepper were mixed. The mixture was shaped into oval and the both sides were baked on a flying pan to obtain low fat hamburgers.

In spite of the fat content less than that of usual hamburgers, the hamburgers obtained had juicy taste, and good savor and taste.

EXAMPLE 5

Coarse Ground Meat Sausage

Eight grams of whey protein, 3 g of casein protein, 6 g of curdlan, 0.3 g of lecithin and 82.8 g of water were mixed with a homomixer. After homogeneously emulsifying, the mixture was heated at 90° C. for 35 minutes to obtain gel. The gel was cooled to obtain 100 g of a fat substitute.

The fat substitute was cut with a silent cutter into pieces of 3 to 6 mm in diameter, 20 g of the pieces, 50 g of minced lean pork, 20 g of minced horseflesh, 8 g of lard, 20 g of water, 0.6 g of sodium phosphate, 1 g of common salt, 0.5 g of carefully refined sugar, 0.02 g of sodium nitrite and 0.1 g of sodium ascorbate were mixed. After packing into collagen casings, the mixture was heated at 75= C. for 40 minutes to obtain low fat sausage.

In spite of the fat content less than 40% of that of usual sausage, the sausage obtained had good savor and taste.

We claim:

1. A substitute for fat meat which comprises water and a gelling material consisting of a whey protein concentrate and a casein protein, the amount of the whey protein concentrate being from about 5 to about 20 percent by weight of the weight of the gelling material and the amount of the casein protein being form about 1 to about 10 percent by weight of the weight of the gelling material.

2. A fat substitute for fat meat food as claimed in claim 1, where the fat meat is processed with food of minced meat or processed with food of fish meat.

3. A substitute for fat meat as claimed in claim 2, wherein the processed food of minced meat or the processed food of fish meat is a sausage, a coarse ground meat type or a hamburger.

4. A substitute for fat meat as claimed in claim 1 which is free of substantial amounts of fat from meat.

5. A substitute for fat meat as claimed in claim 1 which does not contain substantial amounts of vegetable oils.

6. A substitute for fat meat as claimed in claim 1 which is in gel form and consists essentially of said whey, said casein and water.

7. A meat food comprising a substitute for fat meat as claimed in claim 1 mixed with meat or fish.

8. A meat food comprising solid pieces of a substitute for fat meat as claimed in claim 6 mixed with meat or fish.

9. A meat food as claimed in claim 8 wherein said solid pieces of a substitute for fat meat have a diameter between about 1 mm to about 10 mm.

10. A method of making a substitute for fat meat comprising;

mixing water; form about 5 to about 20 percent, by weight of the substitute for fat meat of whey protein concentrate and from 1 to about 10 percent, by weight of the substitute for fat meat of casein protein, and, heating the mixture at a temperature and for a duration sufficient to gel the mixture.

11. A method of making a mixed meat food comprising;

cutting the substitute for fat meat produced according to the method of claim 10, mixing the cut substitute for fat meat with meat or fish to form a mixed meat food, and, packing said mixed meat food into a desired shape.

12. A method of making a meat food according to claim 11 further comprising cooking the meat food product.

13. A substitute for fat meat as claimed in claim 1 which does not contain substantial amounts of fat.

* * * * *